United States Patent
Bayer et al.

(10) Patent No.: US 7,398,233 B1
(45) Date of Patent: Jul. 8, 2008

(54) SYSTEM AND METHOD FOR CONDUCTING PRODUCT CONFIGURATION RESEARCH OVER A COMPUTER-BASED NETWORK

(75) Inventors: Leonard R. Bayer, Rochester, NY (US); Andrew P. Jeavons, Cincinnati, OH (US); David G. Bakken, Pittsford, NY (US)

(73) Assignee: Harris Interactive, Inc., Rochester, NY (US)

(*) Notice: Subject to any disclaimer, the term of this patent is extended or adjusted under 35 U.S.C. 154(b) by 0 days.

(21) Appl. No.: 09/882,203

(22) Filed: Jun. 15, 2001

(51) Int. Cl.
*G06F 17/50* (2006.01)
*G06F 17/30* (2006.01)
*G06Q 30/00* (2006.01)

(52) U.S. Cl. .............................. 705/29; 705/10; 705/26
(58) Field of Classification Search ................ 705/7, 705/10, 26, 27
See application file for complete search history.

(56) References Cited

U.S. PATENT DOCUMENTS

| | | | |
|---|---|---|---|
| 5,124,911 A | | 6/1992 | Sack |
| 5,490,060 A | * | 2/1996 | Malec et al. ................. 364/401 |
| 5,724,262 A | * | 3/1998 | Ghahramani ........... 364/551.01 |
| 5,740,035 A | * | 4/1998 | Cohen et al. ................. 364/401 |
| 5,808,908 A | * | 9/1998 | Ghahramani ........... 364/551.01 |
| 5,999,908 A | * | 12/1999 | Abelow ........................ 705/1 |

(Continued)

FOREIGN PATENT DOCUMENTS

WO    WO 00/46699    8/2000

OTHER PUBLICATIONS

McDonald, Susan Schwartz, "How to Design and Implement Successful Pricing Research", Oct. 1995, Chicago, IL, presentation transcript delivered at teh Professional pricing Society's 6th annual pricing conference.*

(Continued)

*Primary Examiner*—James P. Trammell
*Assistant Examiner*—J. Bradley Wright
(74) *Attorney, Agent, or Firm*—Kenneth J. Lukacher

(57) ABSTRACT

A system and method is provided for enabling respondents at their computer systems to connect with a server computer over a network, such as the Internet, and receive an executable configuration program enabling each respondent to select for each of the features of a product one of multiple subfeature attributes or levels for that feature. Each of the subfeatures for each feature has a price value and the combination of selected subfeatures for the features of the product provides a total price value of the product. The total price value is displayed and updated as subfeatures for the features are selected by the respondent or the selection of subfeatures are changed by the respondent. When the total price value of the product is acceptable to the respondent, and subfeatures have been selected for each feature of the product, the program returns configuration information to the computer server having data representing the subfeatures selected for the product, the total price of the product, the time for the respondent to complete the configuration of the product, and each of the features and subfeatures selected and changed by the respondent in arriving at the final configured product. The configuration program may be part of a survey being conducted over the network by the server computer in which questions of the survey following receipt of the configuration information by the computer server may be in accordance with such configuration information.

11 Claims, 9 Drawing Sheets

U.S. PATENT DOCUMENTS

| | | | |
|---|---|---|---|
| 6,012,051 A | 1/2000 | Sammon, Jr. et al. | |
| 6,064,982 A | 5/2000 | Puri | |
| 6,085,165 A | 7/2000 | Ulwick | |
| 6,167,383 A * | 12/2000 | Henson | 705/26 |
| 6,189,029 B1 * | 2/2001 | Fuerst | 709/217 |
| 6,311,190 B1 | 10/2001 | Bayer et al. | |
| 6,332,129 B1 * | 12/2001 | Walker et al. | 705/26 |
| 6,477,504 B1 * | 11/2002 | Hamlin et al. | 705/10 |
| 6,725,257 B1 * | 4/2004 | Cansler et al. | 709/219 |
| 6,803,926 B1 * | 10/2004 | Lamb et al. | 715/744 |
| 6,810,401 B1 * | 10/2004 | Thompson et al. | 707/101 |
| 6,952,716 B1 * | 10/2005 | Robb et al. | 709/205 |
| 7,003,548 B1 * | 2/2006 | Barck et al. | 709/203 |
| 7,107,224 B1 * | 9/2006 | Weller et al. | 705/10 |
| 7,188,075 B1 * | 3/2007 | Smirnov | 705/10 |
| 2001/0010041 A1 * | 7/2001 | Harshaw | 705/10 |
| 2001/0027410 A1 * | 10/2001 | Ueda | 705/10 |
| 2002/0004739 A1 * | 1/2002 | Elmer et al. | 705/10 |
| 2002/0010668 A1 * | 1/2002 | Travis et al. | 705/35 |
| 2002/0073001 A1 * | 6/2002 | Palmer et al. | 705/29 |
| 2002/0107763 A1 * | 8/2002 | Palmer et al. | 705/29 |
| 2002/0152110 A1 * | 10/2002 | Stewart et al. | 705/10 |
| 2002/0169665 A1 * | 11/2002 | Hughes et al. | 705/14 |
| 2002/0169675 A1 * | 11/2002 | Helot et al. | 705/26 |
| 2002/0178080 A1 * | 11/2002 | Ly et al. | 705/26 |
| 2003/0040954 A1 * | 2/2003 | Zelek et al. | 705/10 |
| 2003/0088458 A1 * | 5/2003 | Afeyan et al. | 705/10 |
| 2004/0177002 A1 * | 9/2004 | Abelow | 705/14 |
| 2004/0193479 A1 * | 9/2004 | Hamlin et al. | 705/10 |
| 2004/0249719 A1 * | 12/2004 | Urpani | 705/26 |

OTHER PUBLICATIONS

Gateway, Inc., Printout of Web Site pages at www.gateway.com/home/prod/hm_profile3cx_config.asp, and commerce.gateway.com/checkout/shoppingcart.asp, 1997-2001.

* cited by examiner

SYSTEM AND METHOD FOR CONDUCTING PRODUCT CONFIGURATION RESEARCH OVER A COMPUTER-BASED NETWORK

FIELD OF THE INVENTION

The present invention relates to a system and method for conducting product configuration research over a computer-based network, and particular to, a system and method for conducting product configuration research over a computer-based network by respondents at their computers to enable each respondent to configure a product and then provide information about the configuration of the product to a server computer over the network. The invention is useful in collecting information regarding consumer preferences about a product efficiently and rapidly to multiple respondents at their computers over a network, such as the Internet.

BACKGROUND OF THE INVENTION

Traditional market research does not facilitate obtaining information as to the desired configuration of a product and the price a person will pay for the product as a tradeoff for the preferred configuration. For example, it is difficult for a fast food company to test the market as to best combinations of items in a meal at a price the consumer finds acceptable, until that meal is actually offered. Today, the Internet provides the ability to conduct research to multiple potential respondents, such as by polling or surveys. For example, such surveys are conducted over the Internet by Harris Interactive Inc. of Rochester, N.Y. However, such surveys on computers are primarily in question and answer formats and do not provide the ability of the consumer to configure a preferred product from among features, such as a meal, car, phone service, or any product having multiple features and available attributes, levels, or quantities for such features.

Although web sites on the Internet can enable a customer to configure on-line particular types of products, such as a computer, such web sites are directed to sales of products, and not for market research in testing preferences of consumers in the configuration of products. The consumer is merely provided with a check off list of the features available, and is not provided with an updated price in real-time as such features are selected or changed, unless the effect of price of each feature is provided to the consumer and the consumer off-line calculates the product with such features. It is only after the configured product is submitted to a web site that the consumer can review the price of the product prior to selecting payment options. Moreover, no information is provided to the web site as to the time it took for the consumer to make their decisions involving the configured product, the steps the consumer took in making tradeoffs for desired attributes about the product at an acceptable price, or follow-up questions regarding how or why the consumer made their decisions.

U.S. Pat. No. 5,124,911, issued Jun. 23, 1992, describes a method of evaluating consumer choice through concept testing for the marketing and development of consumer product. The method elicits consumer evaluations as to attributes of a product and the likelihood of purchasing multiple products, and then performs independent factor analysis on the elicited responses to provide likelihood of purchasing each product. U.S. Pat. No. 6,012,051, issued Jan. 4, 2000, describes a consumer profiling system with analytic decision processor. The system can obtain over the Internet a user's computer preferences and requirements for products, and builds a user profile to assist the user in making decisions. Neither of these patents enables the consumer to configure the features of a product at a computer over a network to provide information about the manner and time to arrive at a final configured product.

SUMMARY OF THE INVENTION

It is the principal object of the present invention to provide a system and method for conducting product configuration research over a computer-based network, such as the Internet or other public network.

It is another object of the present invention to provide a system and method for conducting product configuration research over a computer-based network by respondents at their computers to enable each respondent to configure a product and provide information concerning the configured product to another computer system over the network.

It is still another object of the present invention to provide a system and method for conducting product configuration research over a computer-based network by respondents as part of a survey in which one or more questions of the survey can be altered or selected based on the particular choices made by respondents in arriving at a product configuration.

Briefly described, the system embodying the present invention includes at least one server computer system connected to a network, and at least one client computer system capable of connecting to the server computer system through the network in which the server computer system sends, via the network, to the client computer system an executable program. The program when executed by the client computer system enables a respondent (person or user) at the client computer system, using the client computer system's display and graphical user interface, such as a mouse, to configure the product by selecting at least one of the subfeatures (attributes or levels) for each of the features of the product, and allowing the selected subfeatures to be changed by the respondent until the product is configured with final ones of the selected subfeatures. Each of the possible subfeatures for each feature of the product has a price value, and the combination of the selected subfeatures provides a total price value of the product as the respondent selects or changes the selection of the subfeatures for each of the features of the product. The total price value may be determined based on a total price formula combining the price values of selected subfeatures. For example, such a formula may be a summation of the price values of the selected subfeatures adjusted to account for the effects on the total price by certain combinations of selected subfeatures for features, or simply a summation of price values of selected subfeatures without such adjustment. The total price value is displayed and updated as subfeatures are selected or changed. A finished button is provided to the respondent which when selected (e.g., clicked by mouse) indicates that the respondent has completed the configuration of the product in that the total price value displayed is acceptable to the respondent for the final ones of the subfeatures selected for the product's features. The program has a timer to determine the elapsed time for the respondent to configure the product until the finished button is selected. A list or stack in memory of the client computer system stores all selected subfeatures for the features of the product. This list is appended to each time a subfeature is selected so as to add the selected subfeature and associated feature, and thus records all changes, if any, in selected subfeatures until the final ones of the selected subfeatures are arrived at by the respondent. Data representing configuration information is sent to the computer server when the respondent has configured the product and the finished button is selected, including, at least the final selected subfeatures for the features of the product, all selected subfeatures for features of the product until the final ones of the selected subfeatures, and the elapsed time of the timer. The server computer stores the configuration information received from the client computer system with configuration information received from other respondents.

The server computer system may provide the executable program as part of a survey having questions to the client computer system. The survey may represent an HTML document of one or more screens enabling the user to answer the questions and to send the answers to the server computer for tabulation with questions answered from other respondents. The survey may be provided before and/or after the product configuration information is received, in which one or more questions after the product configuration information is received may be altered or selected based on the configuration information received by the server computer. The server computer may also tabulate each element of the configuration information received for a product from multiple respondents to provide a report as to preferences of the respondents.

Certain of subfeatures when selected for a feature by the respondent may represent a conflict with the selected subfeatures of other features of the product. The program determines when a selected subfeature represents a conflict, and if present, informs the respondent of the client computer system, and resets the respondent's subfeature selection to that before the conflict occurred, thus avoiding the conflict.

The present invention also embodies a method for enabling product configuration research at a computer system over a network, including the steps of: displaying the features of a product; selecting one of the displayed features; displaying possible subfeatures for the selected feature; selecting one of the displayed subfeatures for the selected feature, in which each subfeature associated with the feature has a price value; determining a total price based on the price value of said selected subfeature and any other selected subfeatures of the product; and displaying the total price value. The displayed total price value is updated as features and respective subfeatures are selected or changed, and selecting subfeatures is repeated for each feature until the selected subfeatures for each of the features results in a total price value acceptable to the respondent. If a conflict arises between certain combinations of selected subfeatures for different features, the last subfeature selected causing the conflict is reset to avoid the conflict. The method further comprises determining the elapse time until the selected subfeatures for each of the features provide a total price value acceptable to the respondent, and sending configuration information to another computer system over the network representing at least the selected subfeatures for the features of the product, the total price value, the elapse time, and a list of each of the selected subfeatures and the associated selected feature to provide the steps taken by the respondent in arriving at the configured product. The configuration information is stored at the another computer system.

The configuration information returned from a user is useful in augmenting tradeoff research techniques, such as Conjoint and Discrete Choice Analysis.

BRIEF DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

Figure 1:
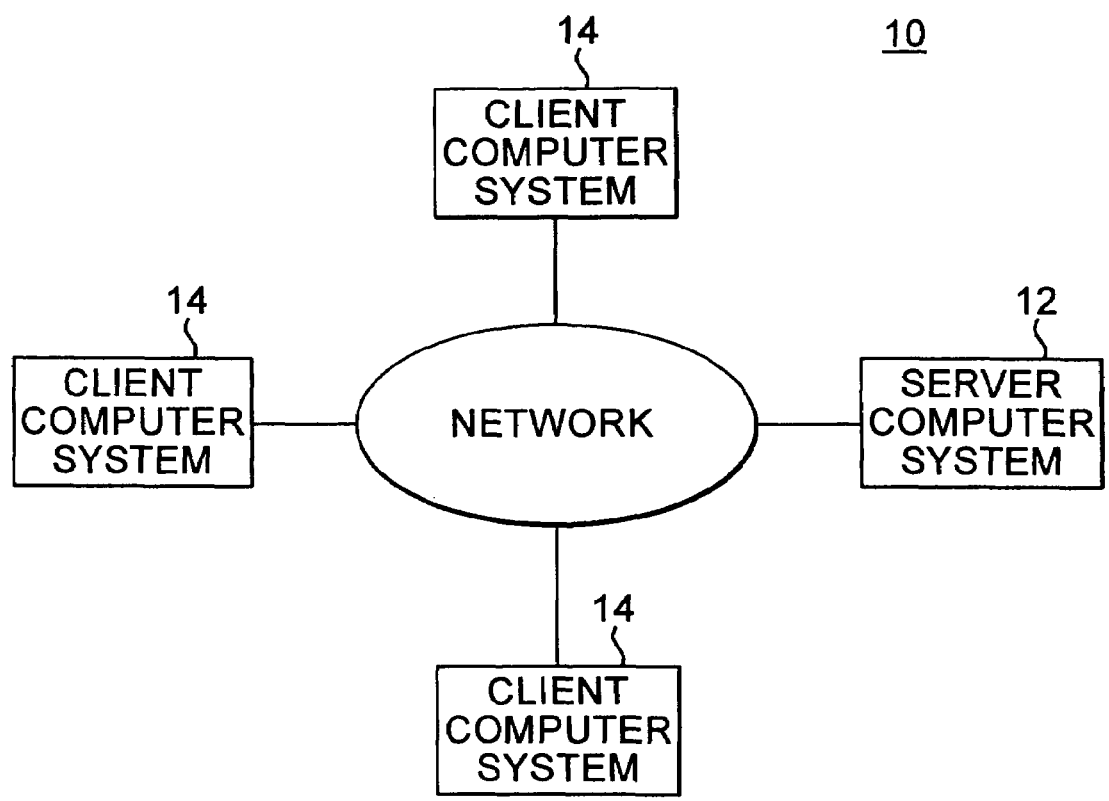
FIG. 1 is a block diagram of the system in accordance with the present invention showing a computer server coupled to one or more client computer systems via a computer-based network.

Referring to FIG. 1, is a block diagram of the system 10 having a network server computer system 12 coupled to client computer systems 14 via a computer based network 13, such as the Internet (including the World Wide Web), or other public network. The server computer 12 may be coupled to one or more of such client computer systems 14, as typical of communication over the Internet. Client computer system 14 may represent a desktop, laptop, WebTV, or other computer system having typical web browser software, such as Microsoft Explorer or NetScape Navigator, and network interface, such as a modem, or T1/T2 data line to an Internet Service Provider, for communicating to web sites at Internet addresses associated with such sites. The client computer systems 14 may each have a display, and a user interface, such as a keyboard and mouse, or other device typically used to enable a graphical user interface on a computer system, such as trackball or touchpad. The server computer 12 provides a web site on network 13 associated with one or more Internet Addresses (or URLs) which is used by the browser software operating on each client computer system 14 to access the web site. A user or person at each client computer system 14, referred to herein as a respondent, may learn of the URL of the web site associated with the computer server 12 by the URL being embedded in an e-mail or web page hyperlink, or by media (print or electronic) providing the URL. One or a number of client computer system 14 may connect to the server computer 12 over network 13.

Figure 2:
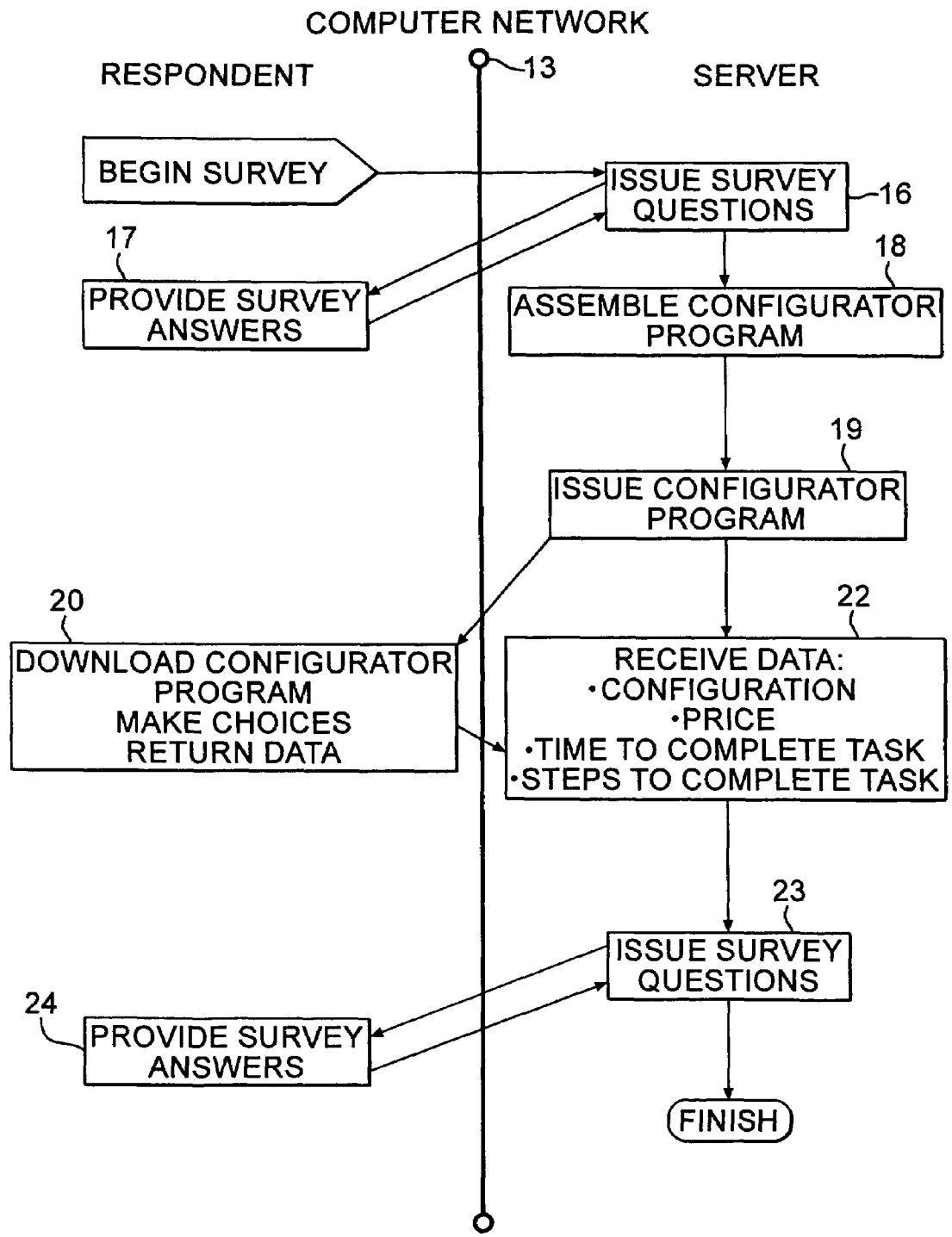
FIG. 2 is a flow diagram of the operation of the system of FIG. 1 over a network in which the right side represents the processing of the computer server and the left side represents the processing at one of the client computer system.

The operation of the system 10 is shown in FIG. 2 as part of a survey. The respondent's client computer system 14 connects to the web site at one or more URL's associated with the server computer 12 to begin the survey. The URL may have embedded identifiers which may identify the particular survey if the server computer 12 is offering more than one survey. In response, server computer 12 issues one or more questions of a survey in a document, such as an HTML page, by sending the questions to the client computer system (step 16), and the respondent, using the user interface (such as keyboard or mouse) of the client computer system 14, answers the questions shown on the display of the client computer system 14, and clicks on a button on the screen to submit the answers, such that the answers are sent to the server computer 12 (step 17). The term "survey" may represent any questions provided to the user which may have a series of answers adjacent to radio buttons or boxes, onto which the user may click using a mouse coupled to the respondent's computer system to indicate their answer. Any other types of answers formats could also be used, such as input fields for entry of alphanumeric characters. The survey may be conducted over a network such as described, for example, in U.S. patent application Ser. No. 09/243,064, filed Feb. 2, 1999, now U.S. Pat. No. 6,311,190, which is herein incorporated by reference. The answers received to the questions are stored in memory (RAM or hard drive, or other typical storage unit) of the server computer 12. The server computer 12 may tabulate or tally the selected answers for the survey, or store specific answers for that survey in its memory.

Next, the server computer 12 assembles the configurator program (or software) (step 18). The configurator program represents a program, such as in JAVAScript language, as will be described in more detail in connection with FIG. 3. The configurator program enables a respondent to select features of a product and subfeatures (attributes or levels) for each of the features, and displays the total price of the product as subfeatures are selected and deselected. The product title; text (names), graphics, or images, of the features and subfeatures of the product, descriptions (text, graphics, or images) associated with each of the features and subfeatures, prices of the subfeatures, a formula for determining the total price, and a conflict matrix of the combinations of features and subfeatures representing conflicts, represent parameters which may be stored in memory of the server computer 12 separate from the program. Each survey, for example, may be for a different product (or version or the product) and thus have different parameters. The configuration program when assembled at step 18 merges the particular parameters for a given survey into the program, such that the program will operate using those parameters. Once assembled, the configurator program is temporarily stored in the server computer 12 for download to a client computer system 14. The configurator program is issued to the client computer system 14 by formatting it into a HTML document as a JAVA applet and then the HTML document being downloaded into memory (RAM) of the client computer system (step 19), where it is automatically executed by browser software and displayed on the display of the client computer system 14.

Using the configurator program, the respondent configures the product's subfeatures (attributes or levels) for each feature of the product, and then returns (sends) data representing configuration information based on the configured product to the server computer (step 20). The data sent by the client computer system 14 is received by the server computer 12 (step 22). The received data with the configuration information represents, the final configured subfeatures for the features of the product, the total price of the product, the time to complete the configuration task, and the steps to complete the configuration task. Steps refers to each intermediate selection of feature and subfeature selected to arrive at the final configured features and subfeatures. The configurator program and the resulting configuration information are described below. After receiving the data representing the configuration information, the server computer 12 sends additional survey questions and the respondent at their computer system 14 submits answers to the questions (steps 23 and 24), similar to steps 16 and 17 described above. However, one or more questions at step 23 may be altered or selected based on the configuration information received, such as questions directed to the reasons why one subfeature was selected over another for a product, or the total price the respondent is willing to pay. For example, a question (or possible answers to a question) may have field(s) for entry of prices, or text, graphics, or images, of a subfeature(s) selected by the respondent which are merged into the question when assembled in the survey document sent to the client computer system. Or, for example, the set of one or more questions may be selected from possible questions stored in the server computer based on, one or more elements of the received configuration information. After the server computer 12 receives the answers to the questions, the respondent is finished and the connection to the server computer may be disabled.

Alternatively, the configurator program may stored in memory of the computer server 12 to be sent to a client computer system, thus not requiring the server computer to assemble the program at step 18 prior to its issuance to the client computer system at step 19. Further, although the configurator program is described as part of a survey it may be part of any document transferable to the client computer system 14. Further, any means for transfer of a program over a network may be used, such as ftp download, and the configuration program is not limited to being a JAVA applet or in an HTML document. Still further, when the configurator program is part of a survey, survey questions may be provided before or after, or before and after, the respondent receives and uses the configurator program, and return configuration information to the server computer.

The client computer system 14 operates in accordance with instructions of the downloaded and stored configurator program at step 20 of FIG. 2. In the configurator program, each feature is identified by a number or code, such as 1, 2, 3, 4 for a product with four features, and each subfeature is identified by a number or code, such as 1, 2, 3, 4 when four possible subfeatures are present for a feature. For example, the pair of (4, 2) would represent the fourth feature having second subfeature selected. An Action Stack in memory of the client computer system records in a list each pair of feature and subfeatures selected by a respondent during the configuration of the product. This list is used to show all the steps of the respondent made in arriving at the final configured product. An Array (or list) in memory of the client computer system stores in a single-dimensional array the current selected subfeatures of the product in which the position in the array corresponds to the features. If no subfeature has been selected, its entry in this Array is zero. For example, a product with four features before selection of any subfeatures is (0, 0, 0, 0), and then after the selection of subfeature for each feature may be (3, 2, 1, 2) in which the third subfeature is selected for the first feature, the second subfeature is selected for the second feature, and so forth. Other data structures may be used to store the current selected subfeatures in memory of the client computer system, and thus the data structure is not limited to an array (or list). The text (name) or representative graphics or images of each feature and its subfeatures with associated descriptive text, graphics, or images are provided in memory as part of the configuration program, along with the price of each subfeature. A total price variable in memory of the client computer system maintains the total price of the product based on a computational formula, such as a summation of the price of each of the subfeatures selected.

The total price formula is illustrated by the following examples. In these examples there are four features 1 to 4, where: (x,y)=1 if feature x and subfeature y is selected by the respondent, otherwise (x,y)=0; [x,y] represents the price value of feature x, subfeature y; and [x,-] represents the price value of whatever subfeature is chosen of feature x.

Example 1: summation of the price values of the subfeatures selected:

Total Price=[1,-]+[2,-]+[3,-]+[4,-]

Example 2: feature four (e.g., toy) is free if the highest subfeature, i.e., 4, of feature 1 (e.g., number of nuggets) is selected:

Total Price=[1,-]+[2,-]+[3,-]+[4,-]-[4,-]*(1,4)

Example 3: price is increased by 10% if the lowest subfeatures (or levels) of features 1, 2, and 3 are selected:

Total Price=[1,-]+[2,-]+[3,-]+[4,-]*(1+0.10*(1,1)*(2,1)*(3,1))

As these examples show, the particular total price formula (or equation) used for a given product configuration in the configuration program is adaptable.

Figure 3:
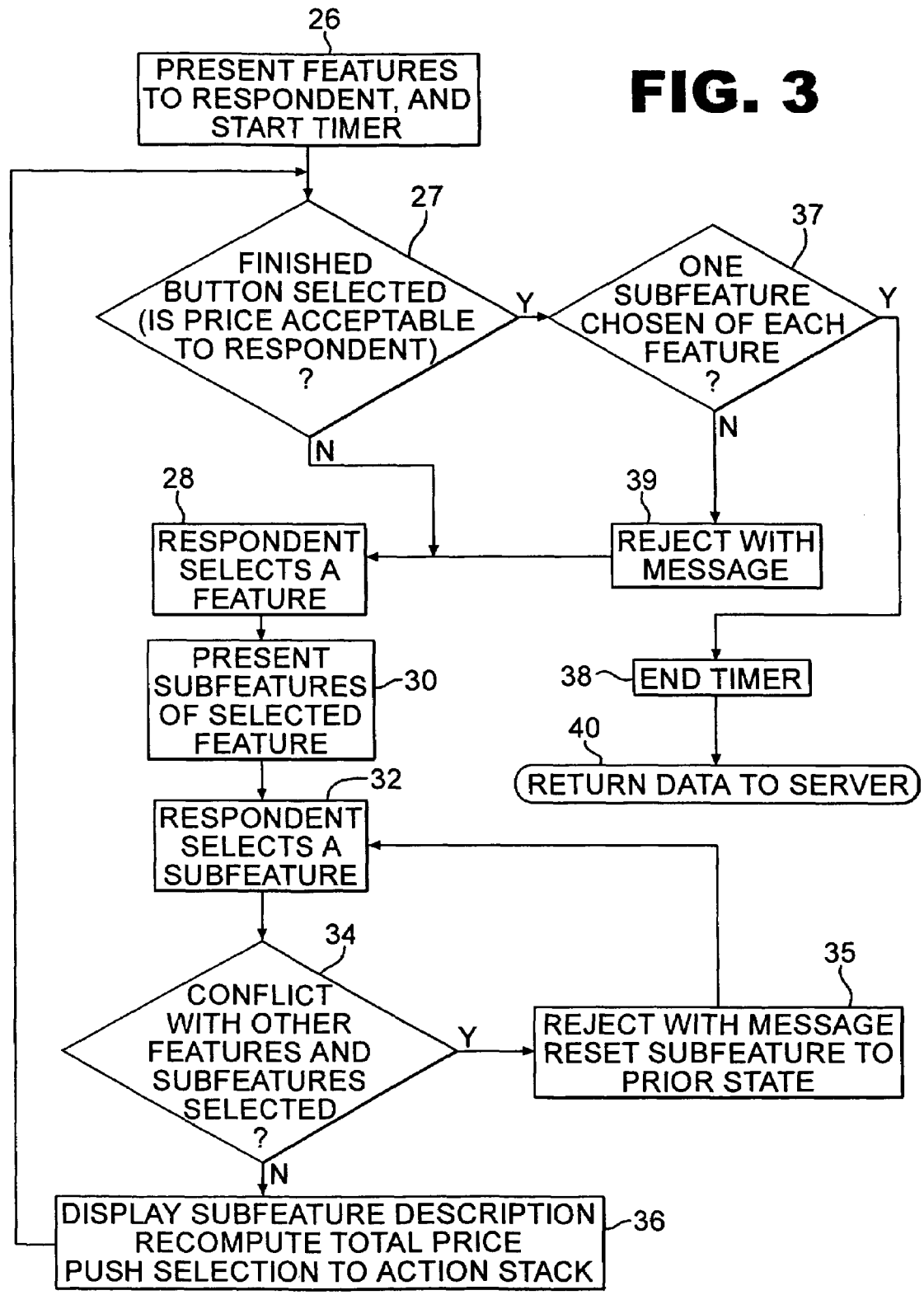
FIG. 3 is a flow chart of the of the configuration program downloaded and executed in FIG. 2 at one of the client computer systems of FIG. 1.

Referring to FIG. 3, a flow chart is shown of the configurator program operating at the client computer system. First, the client computer system 14 builds a window 42 on the display 41 of the client computer system with graphics having a features box 44, features explanation box 45, subfeatures box 46, subfeatures explanation box 47, finished button 48, and total cost box 50. The window 42 is shown in FIG. 4, 5A, 5B, 6-8 in an example of the configuration of a chicken meal by a respondent, such as could be offered by a fast food restaurant. Descriptive titles 44b, 45b, 46b, 47b, and 50a may be provided for boxes 44-47 and 50, respectively. Window 42 shown in the figures is illustrative of an example of the display format of the configurator program, any other information display formats may be used, and such display format is not limited to that shown in the figures. This window 42 is opened by the browser software on display 41 of the client computer system 14 automatically upon executing the configurator program by the client computer system. The features 43 are first presented in features box 44 for selection by the respondent, and a software timer is started (step 26). The software timer may a typical software timer providing a register or variable in memory of the client computer system which measures minutes and seconds based on the computer's clock resident in the client computer system. Next, a check is made as whether the finished button 48 has been clicked by the respondent using a button on the mouse (step 27). If not, the no branch is taken to step 28 in which the client computer system 14 checks the feature selected by the respondent. If no features have yet been selected by the respondent at step 28, the first feature in box 44 is a default selection. The subfeatures for the feature selected is presented in box 46 (step 30), and the respondent selects one of the subfeatures (step 32).

Figure 4:
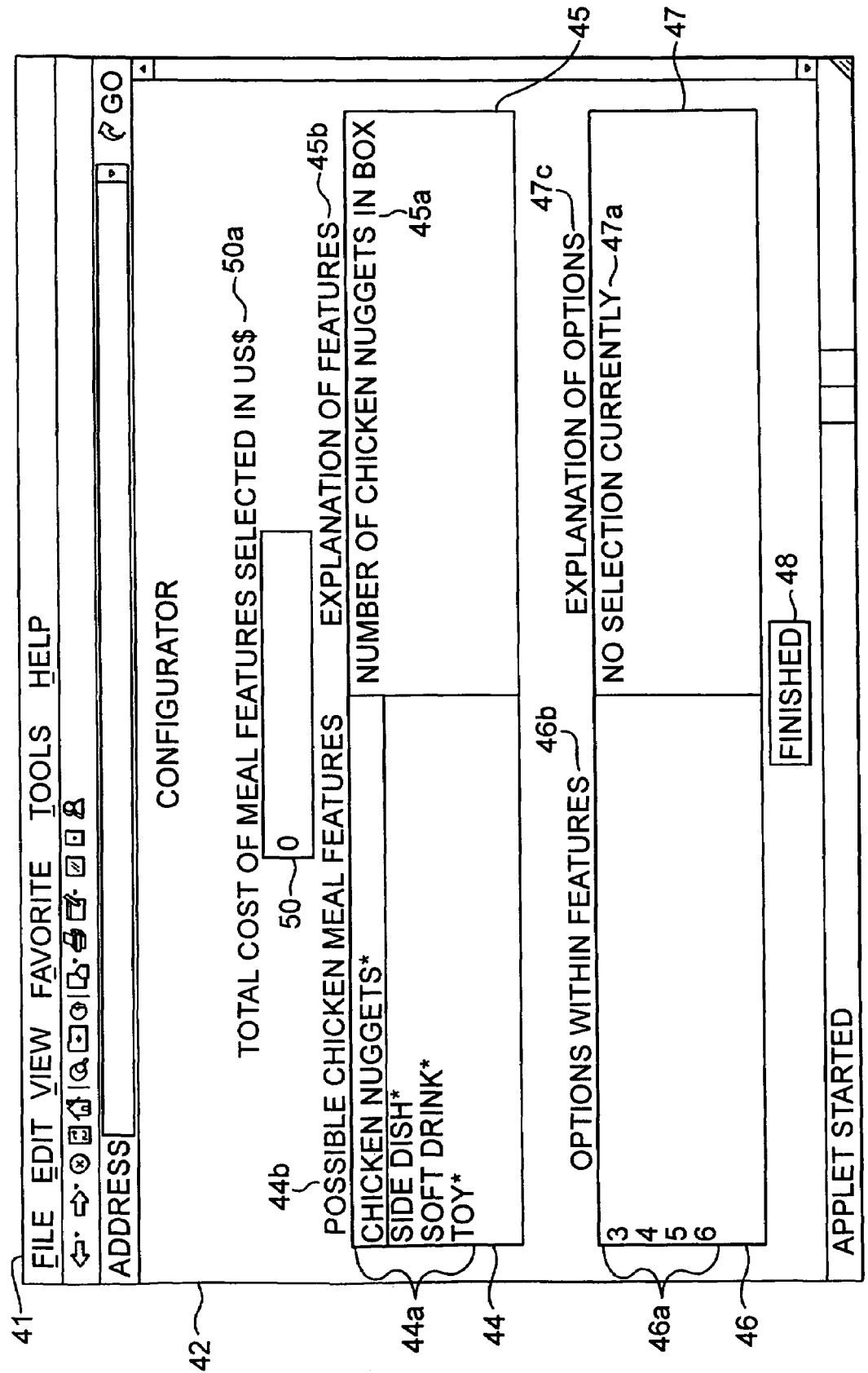
FIG. 4 is a display screen of the configuration program of FIG. 3 for an example of a meal having multiple features prior to selection of subfeature attributes or levels for any of the features.

Upon selection of a feature by the respondent, i.e., clicking a button on the mouse when the curser of the graphical user interface of the client computer system is over the identifying text of the feature to be selected, such identifying text is highlighted (as shown in FIG. 4 for the first listed one of features 44a), descriptive text, graphics, or images providing an explanation of the feature or subfeature options for the feature is provided in features explanation box 45 (as shown in FIG. 4 by description 45a for the first one of features 44a), and text identifying each of the possible subfeature attributes or levels are provided in a subfeatures box 46 (as shown in FIG. 4 by subfeatures 46a).

Figure 5A:
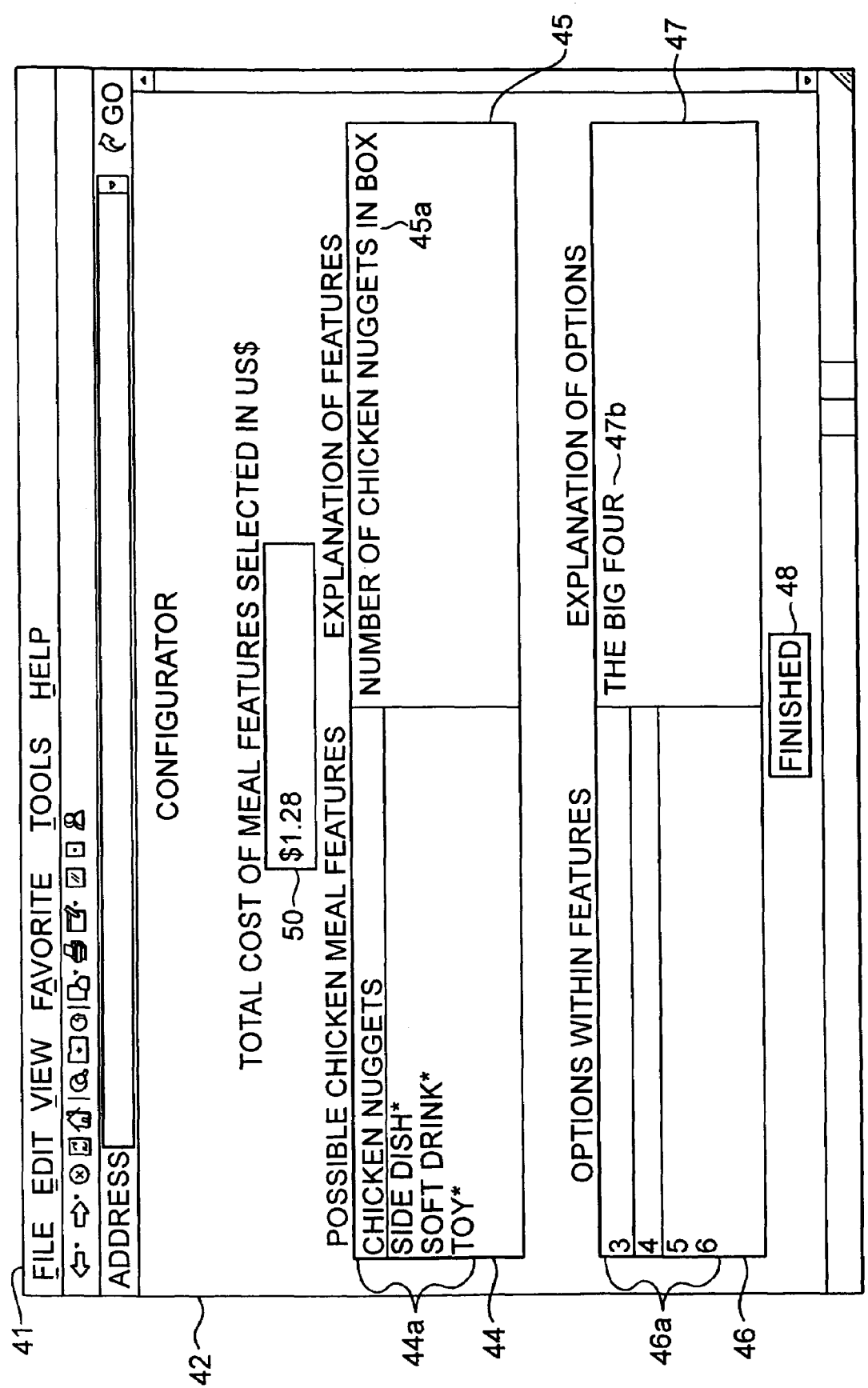
FIGS. 5A and 5B are display screens in the example of FIG. 4 in which the respondent has selected a different subfeature in each figure for the same feature and resulting total price change for the product.

Upon selection of a subfeature attributes or levels by the respondent, i.e., clicking a button on the mouse when the curser of the graphical user interface of the client computer system is over the identifying text of the subfeature to be selected, the subfeature is highlighted (as shown in FIG. 5A for the second one of the listed subfeatures 46a), and descriptive text, graphics, or images providing an explanation of the specific subfeature selected is provided in a subfeatures explanation box 47 (as shown in FIG. 5A by description 47b). Until the respondent selects a subfeature, text 47a (FIG. 4) may be provided in the subfeatures explanation box 47 informing "no selection currently". An asterisk "*" may be provided next to the text identifying each feature in box 44 to indicate to the respondent when no subfeature has yet been selected for that feature.

The feature and subfeature selected are checked for conflicts with the other current selected features and subfeatures, if any (step 34). As stated earlier, an Array stores the current selected subfeatures for each of the features. The combination of the features having non-zero subfeatures in this Array, and the feature and subfeature under selection, is checked against a matrix of conflict combination of pairs of feature and subfeatures. For example, the conflict matrix in the chicken meal example may be as follows: Conflict: Smallest number, subfeature 1, of feature 1, chicken nuggets, (1, 1) will never be served with largest, subfeature 4, of feature 2, side dish, (2, 4) or largest, subfeature 3, of feature 3, soft drink, (3, 3),—the conflict matrix is (1, 1, 2, 4) (1, 1, 3, 3). Thus, in this example, if the respondent first selected feature and subfeature pair is (1, 1) and then later the respondent selects feature and subfeature pair (2, 4) or (3, 3), the client computer system upon checking the conflict matrix for any combinations of pairs of such features and subfeatures would determine the existence of a conflict.

Figure 7:
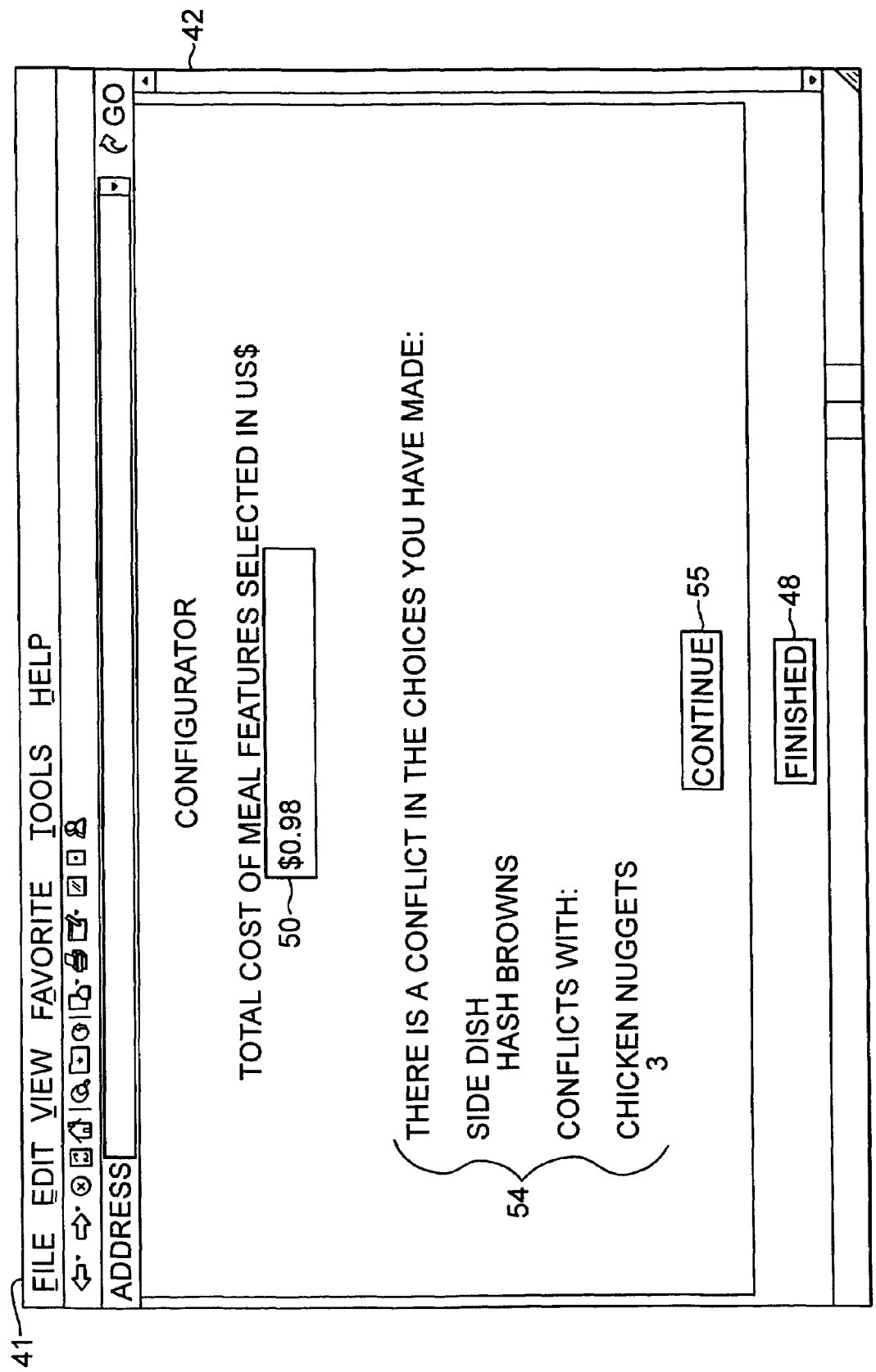
FIG. 7 is a display screen in the example of FIG. 4 when a conflict occurs in the selection of subfeatures for product features by the respondent.
Figure 8:
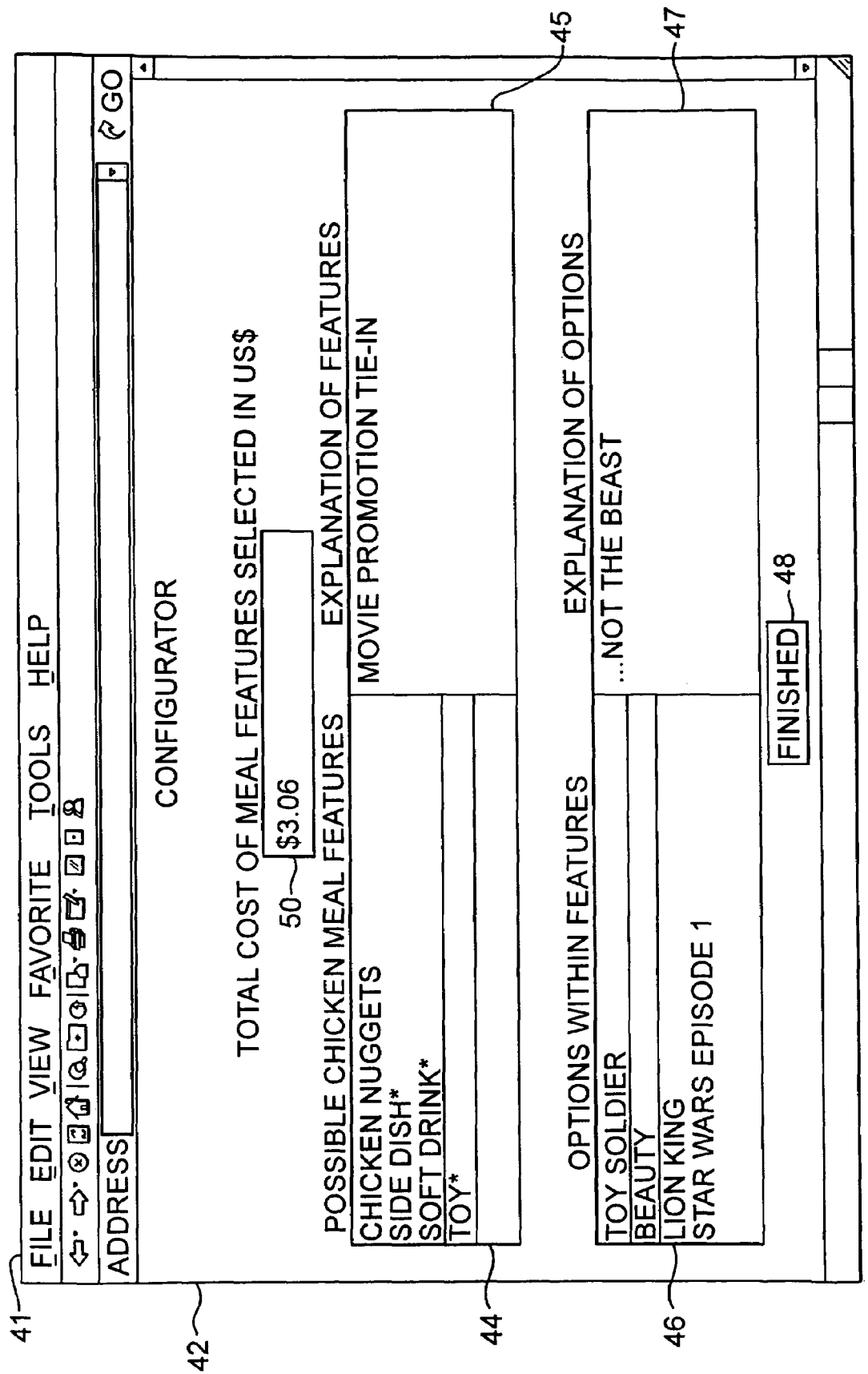
FIG. 8 is a display screen in the example of FIG. 4 when each of the subfeatures has been selected for each feature of the product.

If an entry in the conflict matrix exists which a combination of one or more features and selected subfeatures in the Array with the feature and subfeature under selection, a reject message is provided to the respondent indicating the one or more current features and subfeatures are in conflict with the feature and subfeature under selection (step 35). FIG. 7 shows for example a screen 52 on the display 41 of window 42 showing a conflict message 54. The respondent must then click on the continue button 55 to return to the previous screen at step 32, where the subfeature causing the conflict is reset to the prior state, thereby avoiding the conflict. In other words, the subfeatures in box 46 of window 42 are shown with the selected subfeature, if any, highlighted as stored in Array, and thus resets the respondent's selection to that before the conflict occurred. If no conflict exists (step 34), the selected subfeature is highlighted, its description (explanation) presented in box 47, the Array of current subfeatures is updated, the (feature, subfeature) pair selected is added to the Action Stack, and the total price variable updated in box 50 with a recalculated total price value using the total price formula of the configurator program in accordance with the price values for each selected subfeature (step 36).

Figure 5B:
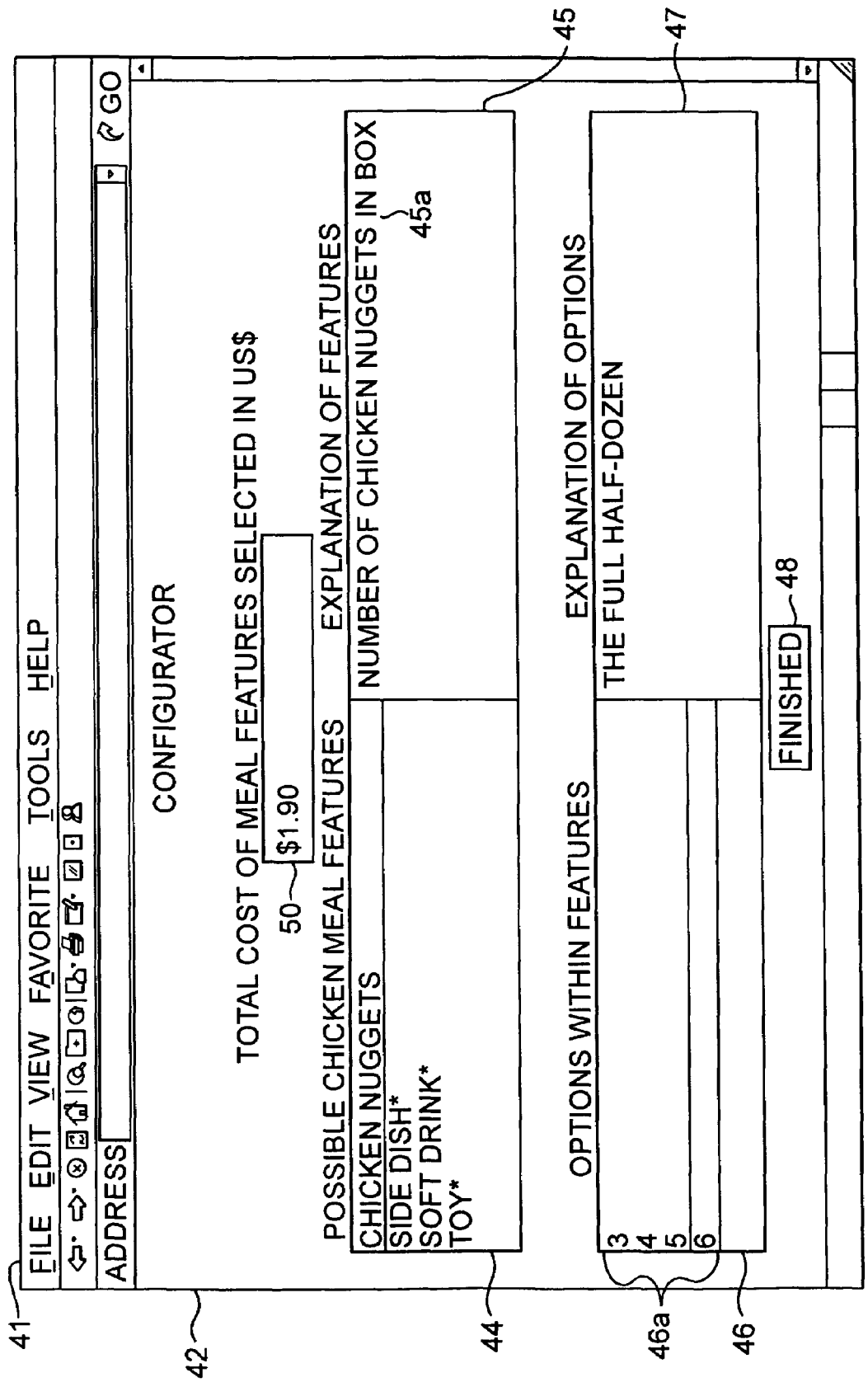
Figure 6:
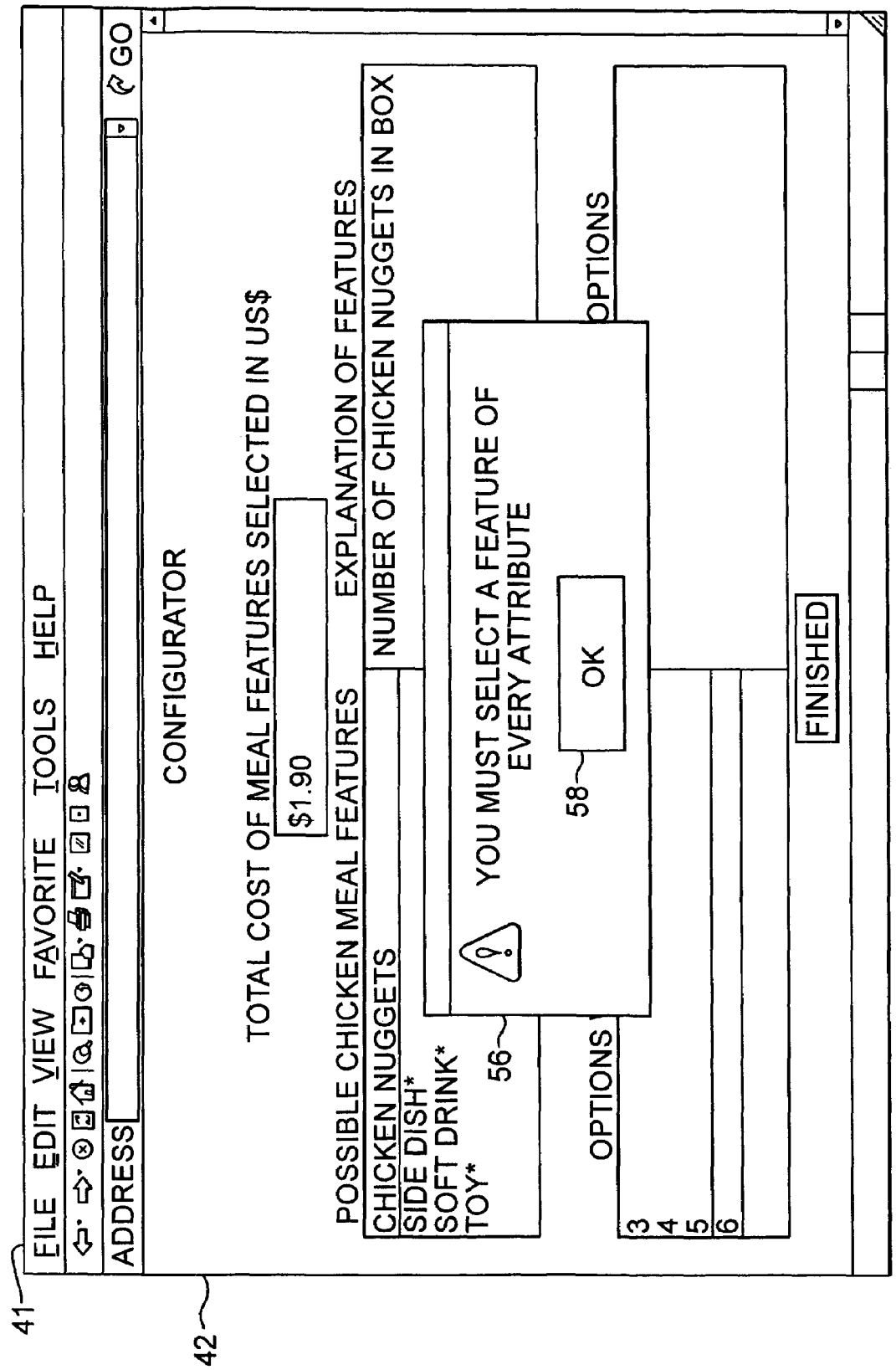
FIG. 6 is a display screen in the example of FIG. 4 showing an error message occurring when the respondent has not selected a subfeature for each feature when the respondent inappropriately indicates completion of product configuration by selecting a finished button.

As stated earlier, each subfeature of a feature has a price value in the configuration program stored in memory of the client computer system. When a subfeature is selected, the price of the subfeature is included in the total price calculation with all other subfeatures selected to provide the total cost of the product. This total cost is displayed in output box or field 50 and updated as each subfeature is selected. For example, in FIG. 4 the output box 50 is zero since no subfeatures have yet been selected for any feature in the chicken meal. In FIG. 5A, the respondent has selected for the "Chicken Nuggets" feature, the "4" subfeature. This subfeature has a $1.28 price value and with no other subfeatures selected for any of the other features, this price value represents the total cost of the product in output box 50. The respondent may change their choice for this subfeature, as shown in FIG. 5B, where the respondent has selected for the "Chicken Nuggets" feature, the "6" subfeature. This automatically highlights the subfeature text of "6" and removes the highlight of the subfeature text of "4", thereby changing the previous subfeature in view of the new subfeature selected. Since this new subfeature has a $1.90 price value and with no other subfeatures selected for any of the other features, this price value now represents the total cost of the product in output box 50.

The client computer system 14 checks if the finished button 48 is selected (i.e., clicked upon by the respondent using a button of the mouse when the curser over the finished button), which indicates that the price is acceptable to the respondent (step 27). The respondent is not supposed to click the finished button 48 until two conditions occur: the total price in box 50 is acceptable to the respondent, and one subfeature has been selected for every feature. The respondent continues to select the subfeatures of each feature of the product as described above until these two conditions are met. The respondent may review their previous subfeature choices by clicking on any of the features in box 44 and viewing their previous subfeature selection, as recorded in Array, by being highlighted in box 46 for that feature, such that they can revise their subfeature selections, to provide a total cost of the product which is acceptable with desired subfeature attributes for the features. Once a non-zero value is stored in Array for a feature, its adjacent asterisk is removed in box 44. Although highlighted (e.g., change in background and/or text color), is used to show selection of feature or subfeature, any other means may be used to show such selection, such as an adjacent check symbol, or other graphical effect. When the respondent has complete making their subfeature selections for each subfeature and the final cost of the product is acceptable to the respondent, as shown for the meal example in FIG. 8 for the final cost of $3.06, the respondent indicates completion of the configuration of the product by clicking on the finished button 48.

If the finished button 48 is selected (step 27), the computer checks the Array of current selected subfeatures to determine if each feature has a selected (non-zero) subfeature (step 37). If a subfeature has been selected for every feature of the product, the software timer is stopped (step 38) and data representing the configuration information is sent to the server computer 12 (step 40). This data includes the values of selected subfeatures in Array, the value of the total price variable, the timer value in minutes and seconds of elapsed time, and the (feature, subfeature) pairs from the Action Stack indicating each step taken to the final configured product. If a subfeature has not been selected for each feature (step 37), the respondent is informed with a reject message 56 indicating the error (step 39), as shown for example in FIG. 6, and respondent by selecting the OK button 58 in the message continues to select a subfeature for each feature at steps 28-32.

The configuration program is shown as a flow chart in FIG. 3 for illustration purposes. It may operate based on states in which the state of the program changes upon input, i.e., selected feature, subfeature, or finished button, as shown, for example, in FIGS. 4, 5A, 5B, and 6-8. Although a meal is provided in the above example, any product having features and subfeatures may similarly be provided to a respondent for selection of subfeatures.

Although each feature has subfeatures, one or more features may be provided with no subfeatures, in which the selection of such features provides a price value included in the total price formula calculation, and such features may optionally be selected by the respondent. Thus step 37 in FIG. 3 would be relevant only to features having subfeatures, and the Array would record the status of a feature without subfeatures as being selected or not by the respondent at a position in the Array having a 1 or 0, respectively. The Action Stack can record selection or deselection of a feature without subfeatures by the pair of the feature, and selection status (1 or 0). Such a pair of feature and selection status could be combined with other pair(s) of feature and subfeature to represent a conflict in the conflict matrix.

The system 10 and configuration program is useful in market research for new product development, configuration building, optimal pricing, and needs-based segmentation. The server computer 12 may store the configuration information received from each respondent for a configured product in a database in its memory unit (e.g., hard drive), and provide statistical reports as the total price, subfeatures selected, elapsed time, or steps taken by the respondent in arriving at the final configured product. The configurator program provides a market researcher with information about the price the respondent is willing to pay for his preferred configuration of the product, while the timing information (elapsed time) provides the researcher with information about the amount of attention paid to the exercise by the respondent. The exercise of configuring a hypothetical product purchase (not a real purchase transaction) is useful for collecting market research information rapidly and efficiently from multiple respondents at their computers over a network. Usage of the configurator program within a survey, where the output is returned to the survey at the point of invocation, allows the researcher to control the remainder of the survey based on choices made by the respondent. The configurator software provides improved information to tradeoff research techniques, such as Conjoint and Discrete Choice Analysis, by letting the respondent direct his preferences.

From the foregoing description, it will be apparent that an improved system and method for conducting product configuration research over a computer-based network has been provided. Variations and modifications of the herein described system and method, and other applications for the invention will undoubtedly suggest themselves to those skilled in the art. Accordingly, the foregoing description should be taken as illustrative and not in a limiting sense.

The invention claimed is:

1. A method for enabling product configuration market research comprising the steps of:

sending market research software from a network addressable site, via a network, to one or more computer systems which when executed by said computer systems enables each user of said computer systems to select the features of a hypothetical product configuration which is not being offered for sale;

displaying via said market research software a total price value of the product at each of said computer systems in accordance with price values of said selected features separate from the operation of said network addressable site;

updating said displayed total price value in accordance with changes in said selected features separate from the operation of said network addressable site;

returning information via said network to said network addressable site having data representing at least said features selected when the user of each of said computer systems has completed the configuration of the product; and determining at least one of new product, product configuration, pricing, or segmentation in accordance with said information.

2. The method according to claim 1 wherein one or more of said features has a plurality of subfeatures for selection by each user of said computer systems, said total price value of the product is further in accordance with the price values of said selected subfeatures, and said data further represents said selected subfeatures for said selected features.

3. The method according to claim 1 further comprising the step of measuring elapse time for each user of the computer systems to configure the product, and said information further comprises data representing said elapse time.

4. The method according to claim 1 wherein said information further comprises data representing said selected features and any changes in the selection of said features by the user of each of said computer systems until said product configuration is completed.

5. The method according to claim 1 wherein said information is unassociated with any real purchase of the product.

6. The method according to claim 1 further comprising the step of sending a survey having questions to each of said computer systems from the network addressable site one of before, after, or before and after said step of sending market research software, which enables the user of each of said computer systems to answer said questions and to send answers to said questions to the network addressable site.

7. A method for enabling product configuration market research comprising the steps of:
sending market research software from a network addressable site, via a network, to one or more computer systems which when executed by said computer systems enables each user of said computer systems to select the features of a hypothetical product configuration which is not being offered for sale;
displaying via said market research software a total price value of the product at each of said computer systems in accordance with price values of said selected features separate from the operation of said network addressable site;
updating said displayed total price value in accordance with changes in said selected features separate from the operation of said network addressable site; and
returning information via said network to said network addressable site having data representing at least said features selected when the user of each of said computer systems has completed the configuration of the product, wherein said information represents market research information relating at least to the total price for a hypothetical configured product the user of each of said computer systems is willing to pay in accordance with said features selected by the user.

8. The method according to claim 7 wherein one or more of said features has a plurality of subfeatures for selection by each user of said computer systems, said total price value of the product is further in accordance with the price values of said selected subfeatures, and said data further represents said selected subfeatures for said selected features.

9. The method according to claim 7 further comprising the step of measuring elapse time for each user of the computer systems to configure the product, and said information further comprises data representing said elapse time.

10. The method according to claim 7 wherein said information further comprises data representing said selected features and any changes in the selection of said features by the user of each of said computer systems until said product configuration is completed.

11. The method according to claim 7 further comprising the step of sending a survey having questions to each of said computer systems from the network addressable site one of before, after, or before and after said step of sending market research software, which enables the user of each of said computer systems to answer said questions and to send answers to said questions to the network addressable site.

* * * * *